Nov. 25, 1958    C. L. E. DE GAUGUE, JR., ET AL    2,861,964
COMPOSITION BRAKE BLOCK
Filed Nov. 17, 1953
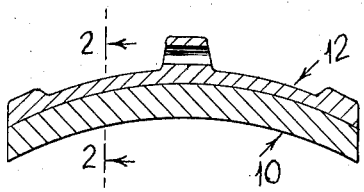
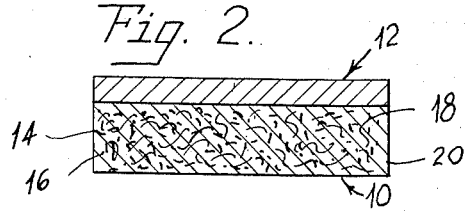
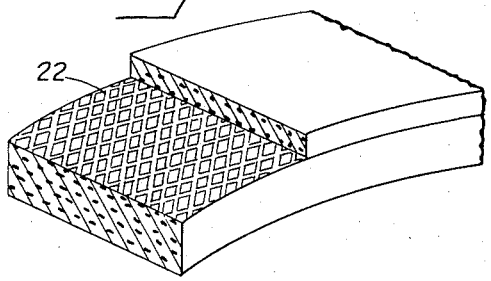
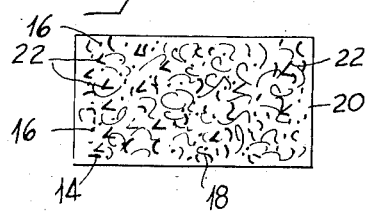
INVENTOR
CHARLES L. E. DE GAUGUE JR
RALPH T. HALSTEAD
BY John A. McKinney
ATTORNEY United States Patent Office 2,861,964
Patented Nov. 25, 1958

2,861,964

COMPOSITION BRAKE BLOCK

Charles L. E. de Gaugue, Jr., Cokesbury, and Ralph T. Halstead, Somerville, N. J., assignors to Johns-Manville Corporation, New York, N. Y., a corporation of New York Application November 17, 1953, Serial No. 392,764

27 Claims. (Cl. 260—17.4)

This invention relates to composition brake blocks and more particularly to a molded brake block of novel composition adapted particularly for braking heavy railway equipment.

This application contains subject matter in common with copending U. S. patent application, Charles L. E. de Gaugue, Jr., Serial No. 279,417, filed March 29, 1952, issued August 10, 1954, as Patent No. 2,686,140, which is a continuation-in-part of U. S. patent application Serial No. 217,790, filed March 27, 1951, and now abandoned, which in turn was a continuation-in-part of U. S. patent application Serial No. 127,864, filed November 17, 1949, and now abandoned.

One of the conventional means of braking railway equipment is by brake shoes of cast iron applied against the steel treads of the wheels, whereby a metal to metal engagement is effected under sufficient applied force to effect deceleration. Compressed air actuated mechanism is usually employed to force the brake shoe into braking engagement with the wheel tread.

An alternative form of railway brake employs engageable rotor and stator discs, the rotor discs being connected to the wheels to rotate therewith, and the stator discs being connected to the stationary frame of the equipment. Brake blocks may be affixed to the face of the stator and applied to the rotor to effect decleration.

The braking of heavy railway equipment using cast iron shoes requires application of high braking force to hold the shoes in braking contact with the wheels or rotor discs, and efficient and effective deceleration develops a high rate of wear for cast iron brake shoes. While the friction coefficient of a cast iron brake shoe is relatively low and the service life short, it is notable that the friction coefficient of such shoe remains substantially constant in either dry or wet weather. In other words, the presence of moisture does not have a serious adverse effect on the braking efficiency of cast iron shoes.

In copending application Serial No. 279,417, there is disclosed a molded composition brake block having properties adapting it for braking heavy railway equipment. As specifically disclosed therein, the molded brake block has characteristics of high friction level and low rate of wear with a wet-to-dry friction coefficient ratio approximating that of cast iron. The block claimed in that application preferably contains fixed proportions of cast iron particles, long-wearing organic friction particles, and staple reinforcing fiber, preferably asbestos, all in a binder matrix comprising an in situ vulcanized elastomer matrix. While the preferred friction element disclosed therein exhibited excellent characteristics adapting it for use as a railway brakeblock, it also exhibited one adverse characteristic in that it had a tendency towards uneven wearing of the tread of the car wheel.

It is an object of this invention to provide a molded brake block having all of the outstanding characteristics of the preferred friction element described and claimed in application Serial No. 279,417, but which does not exhibit the undesirable characteristic of uneven wear on the wheel tread.

With this object in view, the invention consists of the improved molded composition brake block which is hereinafter described and more particularly defined in the appended claims.

In the accompanying drawings, in which preferred embodiments of the invention are illustrated, and wherein like reference characters designate like parts:

Fig. 1 shows in cross-section a molded composition brake block shaped for mounting on an arcuate brake shoe;

Fig. 2 is an enlarged cross-sectional view taken along the line 2—2 of the embodiment of the invention shown in Fig. 1;

Fig. 3 is a fragmental perspective view of a modified metal lath reinforced brake block, with part of the face broken away to show a metal lath reinforcing element in position; and, Fig. 4 is an attempted plan view portrayal of a wearing face of the brake block portrayed in Fig. 3, showing worn portions of an embedded reinforcing lath exposed.

In that embodiment of the invention which is illustrated in Figs. 1 and 2, the numeral 10 designates a molded composition brake block of arcuate shape firmly affixed to, or molded integral with, a metal shoe 12 which is adapted for operation by compressed air actuating mechanism (not shown). It will be understood that the invention is not limited as to the shape of the shoe or block, or as to the means for affixing or anchoring the block facing to the shoe.

As in the aforementioned application, the present invention is directed to a molded brake block of novel composition having a high friction coefficient level preferably approximating 0.300, as compared to 0.080 for cast iron under comparable railway braking conditions. Another important feature of the present brake block composition is that it exhibits a frictional coefficient when wet which is not substantially less than its dry friction coefficient. Thus, for molded brake blocks formed in accordance with this invention the ratio of wet to dry stopping distance under the same initial speed and braking effectiveness does not usually exceed 1.25. Molded brake blocks within the widest composition range herein disclosed have a friction coefficient level at least triple that of cast iron under high speed braking conditions, and have a friction coefficient when wet which is not less than 75% of the dry friction coefficient.

It is also a particular feature of the present brake block composition that the coefficient of friction of these blocks is relatively constant over the entire range of wheel speeds during the braking activity; whereas the coefficient of friction of cast iron brake shoes increases greatly as the wheel speed decreases. Accordingly, a much smoother braking action is obtained when utilizing brake blocks fabricated according to this invention than is obtained when conventional cast iron shoes are employed; that is brake blocks formed in accordance with this invention do not cause the typical jerky stops commonly experienced with railway equipment using cast iron shoes.

While possessing the aforementioned characteristics in common with the preferred molded friction elements described in application Serial No. 279,417, brake blocks formed in accordance with this invention possess the further advantageous characteristic of more even wearing of the wheel tread against which they coact. The prevention of uneven tread wear is, of course, a most desirable characteristic in the blocks hereinafter described, and they also possess a totally unexpected characteristic of longer wear life than blocks containing asbestos fiber as exemplified in application Serial No. 279,417. This characteristic would be unexpected since elimination of some wear on the wheel tread would be expected to result in increased wear on the other coacting body, the brake block.

The molded railway brake blocks formed in accordance with the present invention essentially comprise hard ferrous metal particles, preferably granulated or chipped cast iron; long-wearing organic friction particles, such as common heavily filled hard vulcanized rubber friction particles or conventional resinous friction particles such as granules of cured thermosetting resins as exemplified by polymerized cashew nut shell oil; a vulcanized in situ hard rubber matrix formed from an elastomer composition containing a relatively large amount of conventional fillers and vulcanizing ingredients; and, as distinguished from the preferred blocks claimed in application Serial No. 279,417, a substantial proportion of a staple organic reinforcing fiber. Examples of staple organic reinforcing fibers which may be used in accordance with this invention are cellulose fibers such as wood fiber, cellulose flock (exemplified by the commercial product Solka-floc), viscose and acetate rayon fiber, cotton fiber, etc.; protein fibers such as wool, silk, etc; regenerated protein fibers (e. g. Vicara); alginate fibers; and synthetic polymeric fibers such as polyamide fibers (e. g. nylon), polyethylene and polyhaloethylene fibers (e. g. Polythene, Velon, etc.), polyester fibers (e. g. Dacron), polytetrahaloethylene fibers (e. g. Teflon), polyacrylonitrile fibers (e. g. Orlon) including thermally modified acrylonitrile fibers as, for example, those obtained from the procedure disclosed in the copending application of Irvin Barnett, Serial No. 345,682, filed March 30, 1953, etc.

It is apparent from test results that the excellent frictional characteristics and long service life of the railway brake blocks formed in accordance with this invention are due to a pronounced cooperation between the cast iron particles forming a substantial proportion thereof and the hard, tough elastomer matrix and non-ferrous inorganic and organic filler materials incorporated therein, considering the organic fiber and resinous or rubber friction particles as such fillers. The cooperation of these ingredients lends the block characteristics of long life and frictional efficiency, both wet and dry, not attained in any molded friction materials heretofore proposed or fabricated, nor exhibited by conventional cast iron railway brake blocks.

The staple organic reinforcing fiber cooperates with the organic and inorganic fillers and elastomer matrix to result in the extremely desirable characteristic in the block of less wear on the wheel tread and yet a longer life when compared to the prior blocks in a manner which is most noticeable when employing a cellulosic reinforcing fiber and particularly when using a cellulosic fiber of the chemically modified wood fiber type, such as that marketed under the name Solka-floc. That such staple organic reinforcing fibers could be used in such molded brake blocks and would lend the bodies such desirable characteristics is totally unexpected, since investigations have shown that temperatures as high as 1450° F., well above the destructive temperatures for such fibers, are generated at the friction surfaces under service conditions.

Preferably, the railway brake block 10 (Figs. 1 and 2) formed in accordance with this invention will comprise approximately 25–75% by weight of hard ferrous metal, at least 50% of which is in the form of cast iron chips or granules 14; 10–60% by weight of long wear friction particles 16 comprising either particles of hard vulcanized rubber containing, for example, 50–70% by weight of inorganic fillers and vulcanizing ingredients, or conventional resinous particles as exemplified by granules of cured theromsetting resins such as polymerized cashew nut shell oil; up to 30%, preferably 2 to 10%, staple organic reinforcing fiber 18; from 8–32% of a vulcanized in situ rubber matrix 20 formed from a composition comprising 2–12% by weight of the block of a natural or synthetic rubber such as a butadiene-styrene copolymer (Buna GR–S), together with 4–20% by weight of the block of inorganic and organic fillers and vulcanizing ingredients such as sulfur, litharge, ZnO, carbon black, barytes, etc., which rubber matrix may be stiffened with up to 6% by weight of the block of a thermosetting resin such as phenolaldehyde or cashew nut shell oil resins, etc.

The characteristics of the composition brake blocks for railway service formed in accordance with this invention primarily result from the presence in the composition of high proportions of hard cast iron granules or chips and of the hard vulcanized rubber matrix and its non-ferrous fillers, and organic fiber reinforcement, which matrix has good resistance to heat-softening. The presence of 25–75% by weight of hard ferrous metal chiefly in the form of cast iron particles, and at least 50% by volume (75–25% by weight) of non-ferrous inorganic and organic filler and organic binder materials including the organic reinforcing fiber and a binder matrix of relatively heat-stable vulcanized rubber, is necessary to develop a suitably high friction coefficient, a satisfactory ratio between the wet and dry braking performance for heavy duty railroad service, good resistance to generated heat, even treading characteristics and a long service life. Preferably, the total ferrous metal content is in the form of cast iron chips, and, when so used, the iron content will usually not exceed 65% by weight. While a greater percentage may be employed, an increase in iron chip content over 65% does not result in any significant improvement of wet/dry ratio, and slightly decreases the desirable long wear life of the block. The cast iron particles used in this invention should have the characteristics of those defined in Serial No. 279,417.

In order that the present molded composition brake block have a high coefficient of friction and long wear characteristics, it is preferred that it contain a comparatively high percentage of long wear friction particles of the types described in the aforementioned application.

An alternative form of molded composition brake block may be formed, as illustrated in Figs. 3 and 4 wherein several layers of expanded steel grid lath 22 or equivalent hard ferrous metal reinforcing fabric are incorporated in the block. While these reinforcing grids obviously comprise a part of the total ferrous metal content of these blocks in which they are incorporated, by far the greatest part of the ferrous metal will be present in the form of cast iron chips. The ferrous metal content due to the grids alone should comprise no more than about 15% by weight of the total block composition.

When the hard ferrous metal chips comprise up to 50% by weight of the block, it will be noted that this metal content does not exceed on the average 25% by volume at the exposed wear face of the block, with the result that the block develops a much higher coefficient of friction than, and exhibits a wear life substantially greater than, that of a standard cast iron shoe. In the molded and cured block the cast iron particles, staple organic reinforcing fibers and long wear friction particles are distributed uniformly throughout the hard rubber binder matrix. In other words, the oganic fiber and long wear friction particles may be considered to make up a part of the filler content of the hard rubber, supplementing the content of conventional filler and vulcanizing materials.

Brake blocks of the type illustrated may be manufactured substantially as follows: A suitable molding composition for the block is first prepared in accordance with the formulas heretofore set forth. After thoroughly mixing the particulate ingredients, the mixture is charged into a mold of suitable shape. In the event that expanded metal lath or equivalent metal reinforcing fabric is to be used, layers of such reinforcing fabric are introduced into the mold at spaced intervals paralleling the block face during the operation of charging the mold with the composition material. After filling the mold to predetermined depth with the plastic molding mixture, with or without metal reinforcing fabric, the uncured and plastic block is densified, hardened, and cured within the mold by simultaneous application of high temperature and pressure. Such curing may, for example, take place under a pressure of 2000–5000 (preferably 2500–3000) lbs. per square inch at a temperature equivalent to the temperature of steam at 90 lbs. pressure. In this manner the block is molded to final dimensions and shape, and the various ingredients of the composition are strongly bonded to each other to form a strong unitary block.

The following are examples of various molded composition brake blocks for use in railway brake systems, and their general method of preparation. It is understood, of course, that the compositions of, and methods for producing, these blocks are exemplary and are not to be considered to limit the invention to the particular compositions and operating conditions outlined. All percentages indicated in the examples are by weight.

*Example I*

A railway brake block was prepared by thoroughly mixing a composition comprising:

| | Percent |
|---|---|
| Cast iron chips | 32 |
| Hard rubber friction particles | 46 |
| Cellulose fiber (Solka-Floc) | 6 |
| Hard rubber matrix | 16 |

Butadiene-styrene (Buna GR–S), 3%
  Polymerizable cashew nut shell oil resin, 2%
  Sulfur _____ 1.4%
  Litharge _____ 4.3%
  Zinc oxide _____ 3.6%  }10%
  Carbon black _____ 0.5%
  Hexamethylenetetramine _____ 0.2% and molding said composition to the desired dimensions with a pressure of approximately 3000 lbs./sq. in. and at a temperature of approximately 300° F. The block exhibited a coefficient of friction of 0.300 as compared to 0.180 for a cast iron shoe under the same braking conditions, had a wet/dry stopping distance ratio of substantially 1.0 at high speeds, and had a wear life approximately 3.5 to 4 times that of a standard cast iron railway block.

*Example II*

A railway block was prepared in the same manner as that in Example I from a composition containing:

| | Percent |
|---|---|
| Cast iron chips | 33 |
| Hard rubber friction particles | 47 |
| Thermally modified acrylonitrile fiber | 5 |
| Hard rubber matrix | 15 |

Butadiene-styrene (Buna GR–S), 3%
  Polymerizable cashew nut shell oil resin, 2%
  Sulfur _____ 1.4%
  Litharge _____ 4.3%
  Zinc oxide _____ 3.6%  }10%
  Carbon black _____ 0.5%
  Hexamethylenetetramine _____ 0.2%

The resultant block exhibited frictional characteristics substantially similar to those exhibited by the block formed in accordance with the preceding example.

The invention disclosed herein is not limited to the use of the butadiene-styrene rubber defined in the above examples for the heat resistant vulcanized elastomer matrix. A satisfactory matrix may comprise in place of butadiene-styrene, natural rubber or a synthetic rubber of the Buna N type, i. e., butadiene-acrylonitrile. An alternative, but somewhat less satisfactory, matrix may comprise a polychloroprene such as chlorbutadiene, or any other heat resistant vulcanized rubber which will not pass through an inversion or softening point during heat hardening cure or in use. It is preferred to reinforce the vulcanized rubber matrix with up to 6% by weight of the block of a thermosetting resin of the phenolicaldehyde or cashew nut shell oil type.

It will be understood that the details given are for the purpose of illustration, not restriction, and that variations within the spirit of the invention are intended to be included in the scope of the appended claims.

What I claim is:

1. A molded composition brake block having good wet and dry friction characteristics and a long service life, comprising 25–75% by weight of hard ferrous metal at least 50% of which is in the form of cast iron particles, staple organic reinforcing fiber in amount from 2 to 30% by weight, and at least 50% by volume of non-ferrous inorganic and organic filler and organic binder materials including a binder matrix comprising a heat resistant hard vulcanized in situ rubber selected from the group consisting of natural rubber, polychlorbutadiene, and butadiene-styrene and butadiene-acrylonitrile copolymers.

2. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ rubber selected from the group consisting of natural rubber, polychlorbutadiene, and butadiene-styrene and butadiene-acrylonitrile copolymers.

3. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ butadiene-styrene copolymer synthetic rubber.

4. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ natural rubber.

5. A molded composition brake block having good wet and dry friction characteristics and a long service life comprising 25–75% by weight of hard ferrous metal at least 50% of which is in the form of cast iron particles, staple organic reinforcing fiber in amount from 2 to 30% by weight, and at least 50% by volume of non-ferrous inorganic and organic filler and organic binder materials including a binder matrix comprising a heat resistant vulcanized in situ rubber selected from the group consisting of natural rubber, polychlorbutadiene and butadiene-styrene and butadiene-acrylonitrile copolymers, said binder matrix containing up to 6% by weight of the block of a thermosetting resin stiffener.

6. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant vulcanized in situ rubber selected from the group consisting of natural rubber, polychlorbutadiene and butadiene-styrene and butadiene-acrylonitrile copolymers, said binder matrix containing up to 6% by weight of the block of a thermosetting resin stiffener.

7. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ butadiene-styrene copolymer synthetic rubber, said binder matrix containing up to 6% by weight of the block of a thermosetting resin stiffener.

8. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ natural rubber, said binder matrix containing up to 6% by weight of the block of a thermosetting resin stiffener.

9. A molded composition brake block having good wet and dry friction characteristics and a long service life, comprising 25–75% by weight of hard ferrous metal at least 50% of which is in the form of cast iron particles, from 10–60% by weight of long wearing organic friction particles, staple organic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients.

10. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients.

11. A molded composition brake block having good wet and dry friction characteristics and a long service life, comprising 25–75% by weight of a hard ferrous metal at least 50% of which is in the form of cast iron particles, from 10–60% by weight of long wearing organic friction particles, thermally modified acrylonitrile reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients.

12. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a butadiene-styrene copolymer and a high proportion of inorganic fillers and vulcanizing ingredients.

13. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a natural rubber and a high proportion of inorganic fillers and vulcanizing ingredients.

14. A molded composition brake block having good wet and dry friction characteristics and a long service life, comprising 25–75% by weight of hard ferrous metal at least 50% of which is in the form of cast iron particles, from 10–60% by weight of long wearing organic friction particles, staple organic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener.

15. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener.

16. A molded composition brake block having good wet and dry friction characteristics and a long service life, comprising 25–75% by weight of hard ferrous metal at least 50% of which is in the form of cast iron particles, from 10–60% by weight of long wearing organic friction particles, thermally modified acrylonitrile reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener.

17. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a butadiene-styrene copolymer and a high proportion of inorganic fillers and vulcanizing ingredients, said binder matrix containing up to 6% by weight of the block of a thermosetting resin stiffener.

18. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a natural rubber and a high proportion of inorganic fillers and vulcanizing ingredients, said binder matrix containing up to 6% by weight of the block of a thermosetting resin stiffener.

19. A molded composition brake block having good wet and dry friction characteristics and a long service life, comprising 25–75% by weight of hard ferrous metal at least 50% of which is in the form of cast iron particles, from 10–60% by weight of long wearing organic friction particles, staple organic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said block being reinforced with a hard ferrous metal grid sheet disposed in spaced relation substantially parallel to the friction face of the element.

20. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% of a binder matrix comprising the in situ vulcanization product of a composition comprising a rubber selected from the group consisting of a natural rubber, polychlorbutadiene and butadiene-styrene and butadiene-acrylonitrile copolymers and a high proportion of inorganic fillers and vulcanizing ingredients, said binder matrix containing up to 6% by weight of the block of a thermosetting resin stiffener, and said block being reinforced with a hard ferrous metal grid sheet disposed in spaced relation substantially parallel to the friction face of the element.

21. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ butadiene-acrylonitrile copolymer synthetic rubber.

22. A molded composition brake block having good wet and dry friction characteristics and a long service life, comprising 25–75% by weight of hard ferrous metal at least 50% of which is in the form of cast iron particles, cellulosic reinforcing fiber in amount from 2 to 30% by weight, and at least 50% by volume of non-ferrous inorganic and organic filler and organic binder materials including a binder matrix comprising a heat resistant hard vulcanized in situ butadiene-acrylonitrile copolymer synthetic rubber, said binder matrix containing up to 6% by weight of the block of a thermosetting resin stiffener.

23. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–32% by weight of a binder matrix comprising the in situ vulcanization product of a composition comprising a butadiene-acrylonitrile copolymer and a high proportion of inorganic fillers and vulcanizing ingredients.

24. A molded composition brake block having good wet and dry friction characteristics and a long service life, comprising 25–75% by weight of hard ferrous metal at least 50% of which is in the form of cast iron particles, from 10–60% by weight of long wearing organic friction particles, cellulosic reinforcing fiber in amount from 2 to 30% by weight, and from 8–21% of a binder matrix comprising the in situ vulcanization product of a composition comprising butadiene-acrylonitrile copolymer and a high proportion of inorganic fillers and vulcanizing ingredients, said binder matrix containing up to 6% by weight of the block of a thermosetting resin stiffener.

25. A molded composition brake block having good wet and dry friction characteristics and a long service life, comprising approximately 32% by weight of cast iron chips, approximately 46% by weight of hard rubber friction particles, approximately 6% of cellulosic reinforcing fiber, and approximately 16% of a binder matrix comprising the in situ vulcanization product of a composition comprising rubber selected from the group consisting of a natural rubber, polychlorbutadiene, butadiene-styrene and butadiene-acrylonitrile copolymers, and a high proportion of inorganic fillers and vulcanizing ingredients.

26. A molded composition brake block having good wet and dry friction characteristics and a long service life, comprising approximately 32% by weight of cast iron chips, approximately 46% by weight of hard rubber friction particles, approximately 6% of cellulosic reinforcing fiber, and approximately 16% of a binder matrix comprising the in situ vulcanization product of a composition comprising natural rubber and a high proportion of inorganic fillers and vulcanization ingredients.

27. A molded composition brake block having good wet and dry friction characteristics and a long service life, comprising approximately 32% by weight of cast iron chips, approximately 46% by weight of hard rubber friction particles, approximately 6% of cellulosic reinforcing fiber, and approximately 16% of a binder matrix comprising the in situ vulcanization product of a composition comprising a butadiene-styrene copolymer and a high proportion of inorganic fillers and vulcanization ingredients, said binder matrix containing approximately 2% by weight of the block of thermosetting resin stiffener.

References Cited in the file of this patent
UNITED STATES PATENTS

| | | |
|---|---|---|
| 2,460,367 | Sharpe | Feb. 1, 1949 |
| 2,663,693 | Hess et al. | Dec. 22, 1953 |
| 2,673,146 | Kuzmick et al. | Mar. 23, 1954 |
| 2,686,140 | De Gaugue | Aug. 10, 1954 |

UNITED STATES PATENT OFFICE

CERTIFICATE OF CORRECTION

Patent No. 2,861,964                                             November 25, 1958

Charles L. E. de Gaugue, Jr., et al.

It is hereby certified that error appears in the printed specification of the above numbered patent requiring correction and that the said Letters Patent should read as corrected below.

Column 10, line 18, claim 24, for "and from 8-21% of a binder matrix" read -- and from 8-32% of a binder matrix --.

Signed and sealed this 22nd day of September 1959.

(SEAL)
Attest:

KARL H. AXLINE
Attesting Officer

ROBERT C. WATSON
                                                                                                Commissioner of Patents